(12) United States Patent
Jang et al.

(10) Patent No.: US 8,462,080 B2
(45) Date of Patent: Jun. 11, 2013

(54) DISPLAY DEVICE DISPLAYING SINGLE OR DUAL IMAGES AND METHOD OF DRIVING THE SAME

(75) Inventors: Hyung-Seok Jang, Gyeonggi-do (KR); Joon-Kyu Park, Gyeonggi-do (KR); Hyun-Suk Jin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 978 days.

(21) Appl. No.: 11/452,260

(22) Filed: Jun. 14, 2006

(65) Prior Publication Data

US 2007/0146267 A1    Jun. 28, 2007

(30) Foreign Application Priority Data

Dec. 22, 2005  (KR) .................. 10-2005-0127740

(51) Int. Cl.
*G09G 5/00* (2006.01)
*G09G 3/38* (2006.01)
*G02B 27/02* (2006.01)

(52) U.S. Cl.
USPC ............................... 345/5; 345/105; 359/462

(58) Field of Classification Search
USPC .................... 345/4–6, 40, 105; 359/462–477, 359/577–590; 349/112
See application file for complete search history.

(56) References Cited

U.S. PATENT DOCUMENTS

| | | | |
|---|---|---|---|
| 5,833,507 A | 11/1998 | Woodgate et al. | |
| 5,969,850 A * | 10/1999 | Harrold et al. | 359/465 |
| 6,049,424 A * | 4/2000 | Hamagishi | 359/462 |
| 6,144,479 A * | 11/2000 | Lugg et al. | 359/586 |
| 6,587,083 B1 | 7/2003 | Basturk | |
| 7,154,653 B2 * | 12/2006 | Kean et al. | 359/462 |
| 7,268,747 B2 * | 9/2007 | Taniguchi et al. | 345/6 |
| 7,349,043 B2 * | 3/2008 | Sumiyoshi et al. | 349/112 |
| 7,365,707 B2 * | 4/2008 | Schobben et al. | 345/9 |
| 2005/0280602 A1 * | 12/2005 | Tzschoppe et al. | 345/6 |
| 2006/0098281 A1 * | 5/2006 | Fukushima et al. | 359/464 |
| 2006/0126177 A1 * | 6/2006 | Kim et al. | 359/465 |

FOREIGN PATENT DOCUMENTS

| | | |
|---|---|---|
| CN | 1534328 A | 10/2004 |
| CN | 1330796 A | 1/2009 |
| JP | 03-119889 | 5/1991 |
| JP | 07-123342 | 5/1995 |
| JP | 08-076058 | 3/1996 |
| JP | 09-22006 | 1/1997 |
| JP | 9-22006 A | 1/1997 |
| JP | 2001-134221 | 5/2001 |
| JP | 2005 77707 A | 3/2005 |
| WO | 2004/036287 A1 | 4/2004 |
| WO | WO 2004077839 A1 * | 9/2004 |

OTHER PUBLICATIONS

Office Action issued Jan. 25, 2010 in corresponding Japanese Application No. 2006-169633.

* cited by examiner

*Primary Examiner* — Adam J Snyder
(74) *Attorney, Agent, or Firm* — Morgan, Lewis & Bockius LLP

(57) ABSTRACT

A display device includes a display cell having a plurality of sub-pixels to make a single image or dual images, and a control cell for passing through the single image, and guiding a first image of the dual images toward a first direction and a second image of the dual images toward a second direction different from the first direction.

20 Claims, 7 Drawing Sheets

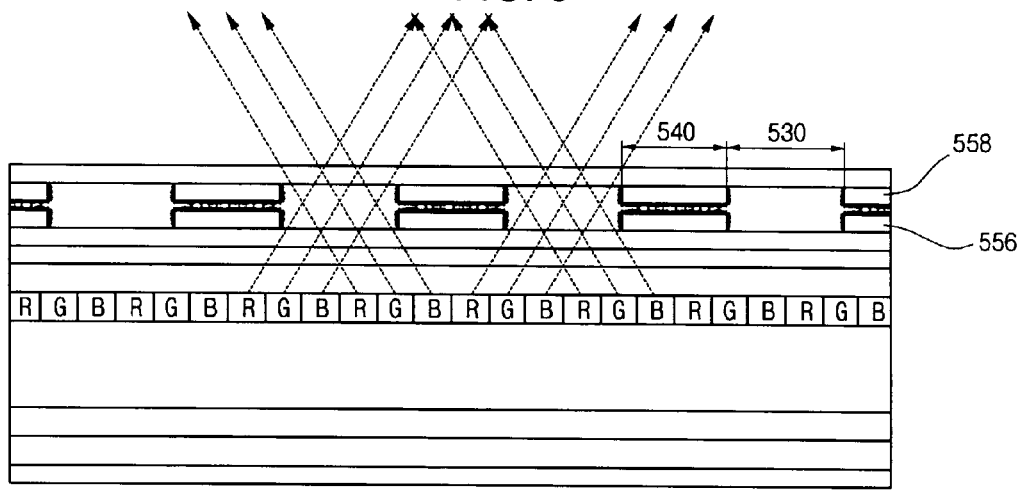
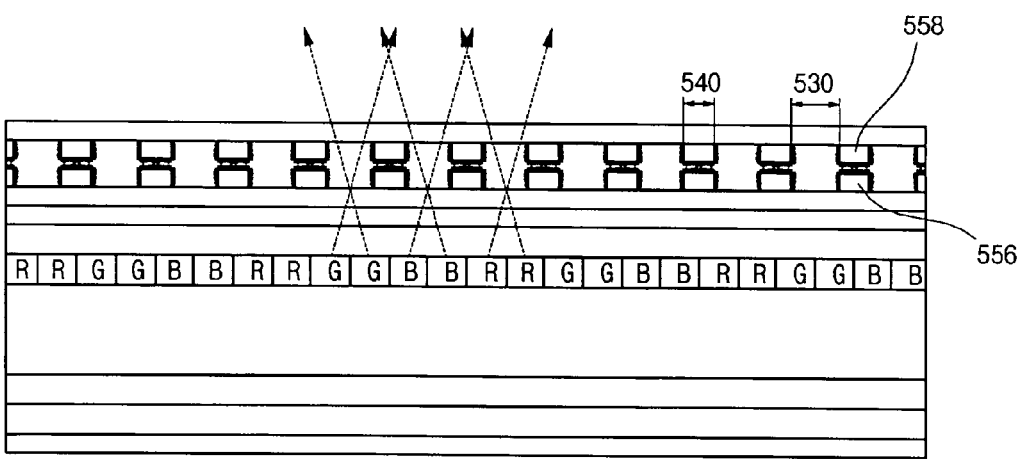

DISPLAY DEVICE DISPLAYING SINGLE OR DUAL IMAGES AND METHOD OF DRIVING THE SAME

The present invention claims the benefit of Korean Patent Application No. 10-2005-0127740, filed in Korea on Dec. 22, 2005, which is hereby incorporated by reference in its entirety.

FIELD OF THE INVENTION

The present invention relates to a display device, and more particularly, to a display device and a method of driving the same.

DISCUSSION OF THE RELATED ART

Until recently, cathode-ray tubes (CRTs have been typical display devices). Presently, much effort is being expanded to study and develop various types of flat panel displays, such as liquid crystal display (LCD) devices, plasma display panels (PDPs), field emission displays (FED), and electro-luminescence displays (ELDs), as a substitute for CRTs. These types of flat panel displays have been driven in an active matrix type display in which a plurality of pixels arranged in a matrix form are driven using a plurality of thin film transistors therein. Among the active matrix types of flat panel displays, liquid crystal display (LCD) devices and electroluminescent display (ELD) devices are widely used for notebook computers and desktop computers because of their high resolution, ability to display colors and superiority in displaying moving images.

In general, an LCD device includes two substrates that are spaced apart and face each other with a layer of liquid crystal molecules interposed between the two substrates. The two substrates include electrodes that face each other such that a voltage applied between the electrodes induces an electric field across the layer of liquid crystal molecules. Alignment of the liquid crystal molecules changes in accordance with the intensity of the induced electric field in the direction of the induced electric field, thereby changing the light transmissivity of the LCD device. Thus, the LCD device displays images by varying the intensity of the induced electric field across the layer of liquid crystal molecules.

FIG. 1 is a schematic exploded perspective view of a twisted nematic mode LCD device according the related art. As shown in FIG. 1, the LCD device of the related art includes a first substrate 110, a second substrate 120 and a layer of twisted nematic liquid crystal molecules 130 between the first and second substrates 110 and 120. The first substrate 110 is often referred to as an array substrate and the second substrate 120 is often referred to as a color filter substrate.

A gate line GL and a data line DL are disposed on an inner surface of the first substrate 110 and cross each other to define a sub-pixel region PA. A thin film transistor T is disposed at the crossing of the gate and data lines GL and DL. A pixel electrode 112 is disposed in the sub-pixel region PA and connected to the thin film transistor T.

A black matrix 124 is disposed on the second substrate 120 for shielding light except in pixel regions. A color filter layer 126, including red (R), green (G) and blue (B) color filters 126a, 126b and 126c, are disposed on an inner surface of the second substrate 120 in the black matrix 124 corresponding to the pixel regions. A common electrode 122 is disposed on the black matrix 124 and the color filter layer 126.

The twisted nematic liquid crystal molecules are initially twisted by 90 angle degrees along a vertical direction. Then, when voltages are applied across the pixel and common electrodes 112 and 122, alignment of the twisted nematic liquid crystal molecules changes in accordance with the vertical electric field induced between the two electrodes 112 and 122. Therefore, contrast ratio and brightness are abruptly changed as a viewing angle changes, and thus it is difficult to achieve a wide viewing angle. To resolve this problem, an in-plane switching (IPS) mode LCD device, a fringe field switching (FFS) mode LCD device, a vertical alignment (VA) mode LCD device and the like are suggested.

FIGS. 2A to 2C are cross-sectional views illustrating an IPS mode LCD device, a FFS mode LCD device and a VA mode LCD device, respectively, according to the related art. As shown in FIG. 2A, the IPS mode LCD device includes first and second substrates 210 and 220, and a layer of liquid crystal molecules 230 between the two substrates 210 and 220. A pixel electrode 212 and a common electrode 222 are disposed on the first substrate 210 to induce an in-plane electric field 200. The in-plane electric field 200 controls alignment of the liquid crystal molecules. In the IPS mode LCD device, the change in the refraction of liquid crystal molecules is low as the viewing angle changes, and thus the viewing angle becomes wide. However, aperture ratio is reduced, and the transmissivity is not good. To improve these problems, an FFS mode LCD device is suggested.

As shown in FIG. 2B, the FFS mode LCD device includes first and second substrates 210 and 220 and a layer of liquid crystal molecules 230 between the two substrates 210 and 220. A common electrode 222 is disposed uniformly in a pixel region on the first substrate 210. A plurality of pixel electrodes 212 are spaced apart from one another. An insulating layer 214 is interposed between the common electrode 222 and the pixel electrode 212. In this structure, a strong, in-plane electric field 200 is induced at an interval of several angstroms, and makes liquid crystal molecules over the pixel electrodes 212 re-arrange. Therefore, the aperture ratio and transmissivity are improved. The common electrode 222 may have a different shape, for example, a rod shape, where the common electrode 222 may be closely disposed to the pixel electrode 212.

As shown in FIG. 2C, the VA mode LCD device includes first and second substrates 210 and 220 and a layer of liquid crystal molecules 230 between the two substrates 210 and 220. A sub-pixel region is divided into multiple domains. Liquid crystal molecules are arranged vertically in an initial state. The multiple domains have different main viewing angles. By using the multiple domains, a viewing angle can be improved. To make the multiple domains, a groove or protrusion is formed in the common electrode 222. Therefore, in the multiple domains, different vertical electric fields 200 are induced, and liquid crystal molecules are arranged in accordance with the electric fields 200.

The above explained IPS mode, FF mode and VA mode LCD devices have a wide viewing angle, and users can see the same image over a wide range of different angles. This is useful when many users want to view the same image. However, when users want to view differently displayed images, for example, kids want to view a movie while adults want to view the news at the same time, a separate display device is needed for each image or a portion of the display is used for one image and another portion of the display is used for the other image. Therefore, to display different images in the related are, either display panel space is sacrificed or cost increase due to the purchase of another display panel.

SUMMARY OF THE INVENTION

Accordingly, the present invention is directed to a display device and a method of driving the same that substantially obviate one or more of the problems due to limitations and disadvantages of the related art.

An object of the present invention is to provide a display device for displaying a single image or dual images Another object of the present invention is to provide a display device for displaying a first image within a first viewing angle range and a second image in a second viewing angle range.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device includes a display cell having a plurality of sub-pixels to make a single image or dual images, and a control cell for passing through the single image, and guiding a first image of the dual images toward a first direction and a second image of the dual images toward a second direction different from the first direction.

In another aspect, a method of driving a display device includes making a single image or dual images in a display cell having a plurality of sub-pixels, and passing the single image through a control cell to display the single image, and guiding a first image of the dual images toward a first direction and a second image of the dual images toward a second direction different from the first direction through the control cell to display the dual images.

In another aspect, a method of driving a display device includes a method of driving a display device includes making a single image or dual images in a display cell, and making a control cell entirely transparent for the single image to pass through when displaying the single image, alternatingly transparent and opaque to pass first and second images of the dual images toward first and second directions, respectively, and blocking the first and second images toward the second and first directions, respectively, when the display cell displays the dual images It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 4A to 4E and FIGS. 5 to 7 are cross-sectional views of liquid crystal display devices according to another exemplary embodiments of the present invention.

DETAILED DESCRIPTION OF THE PREFERRED EMBODIMENTS

Reference will now be made in detail to the illustrated embodiments of the present invention, which are illustrated in the accompanying drawings.

Figure 1:
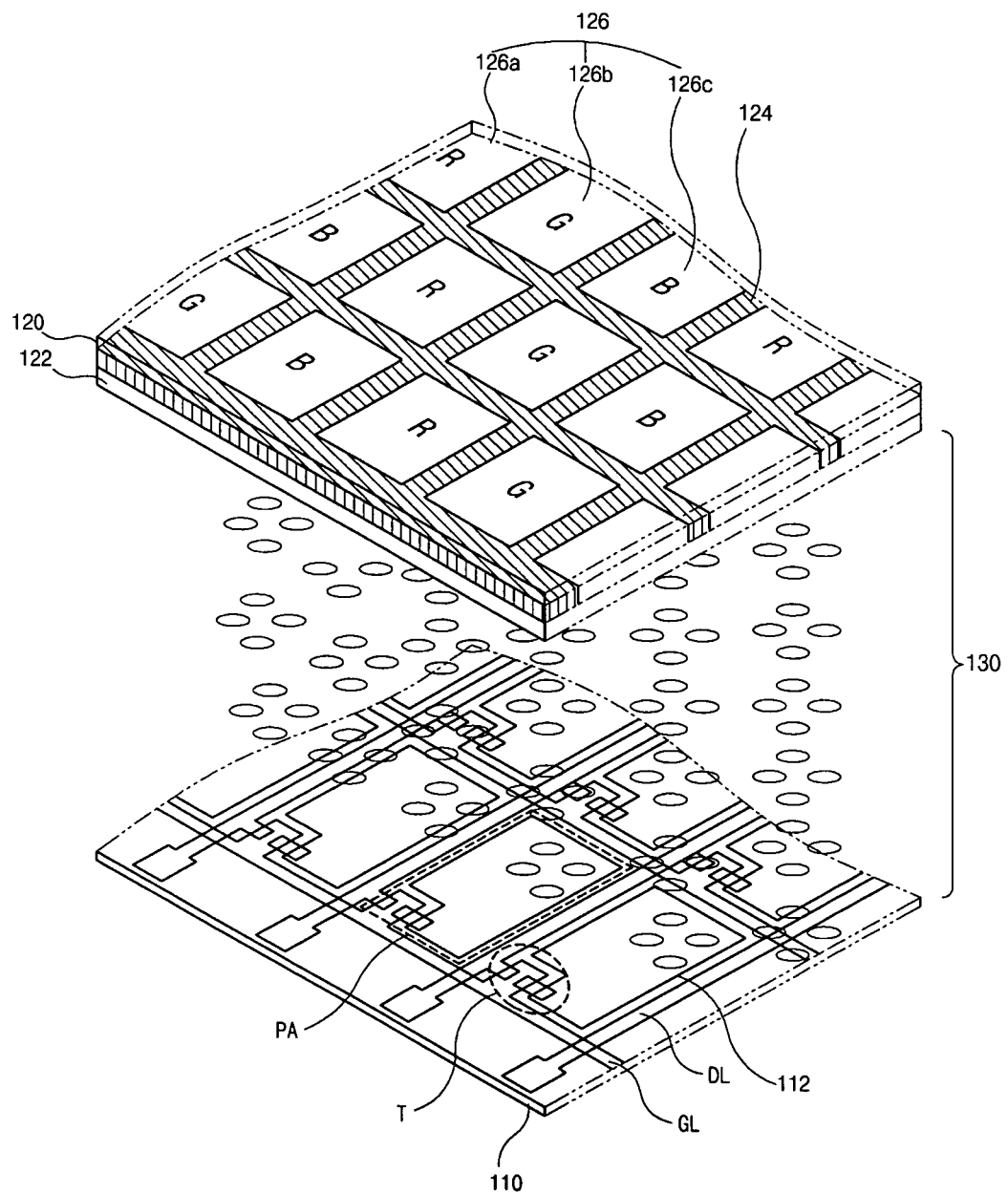
FIG. 1 is a schematic exploded perspective view of a twisted nematic mode LCD device according to the related art.
Figure 2A:
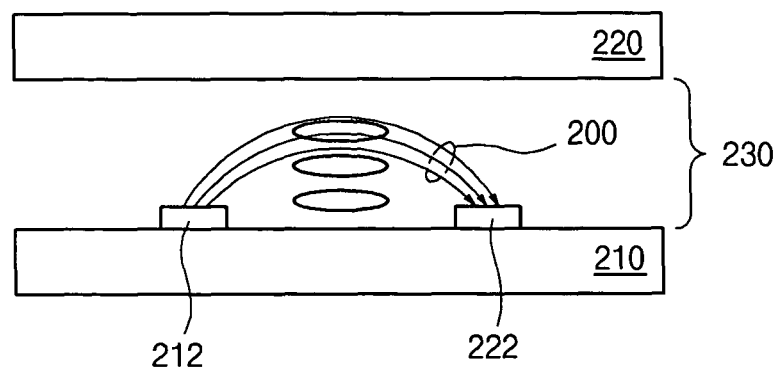
FIGS. 2A to 2C are cross-sectional views illustrating an IPS mode LCD device, an FFS mode LCD device and a VA mode LCD device, respectively, according to the related art.
Figure 2B:
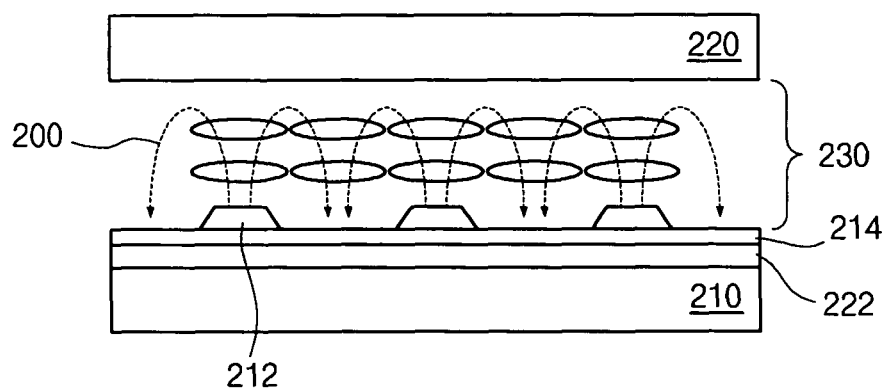
Figure 2C:
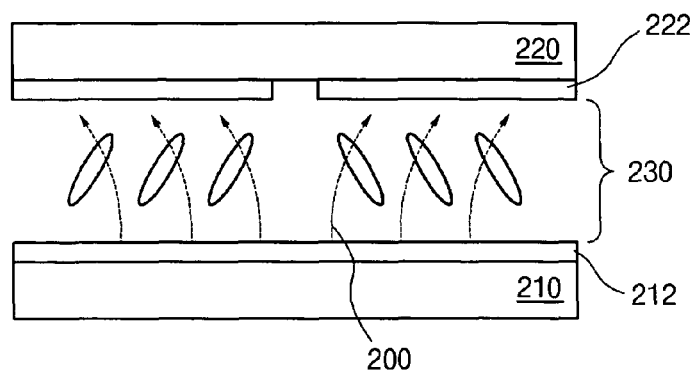
Figure 3A:
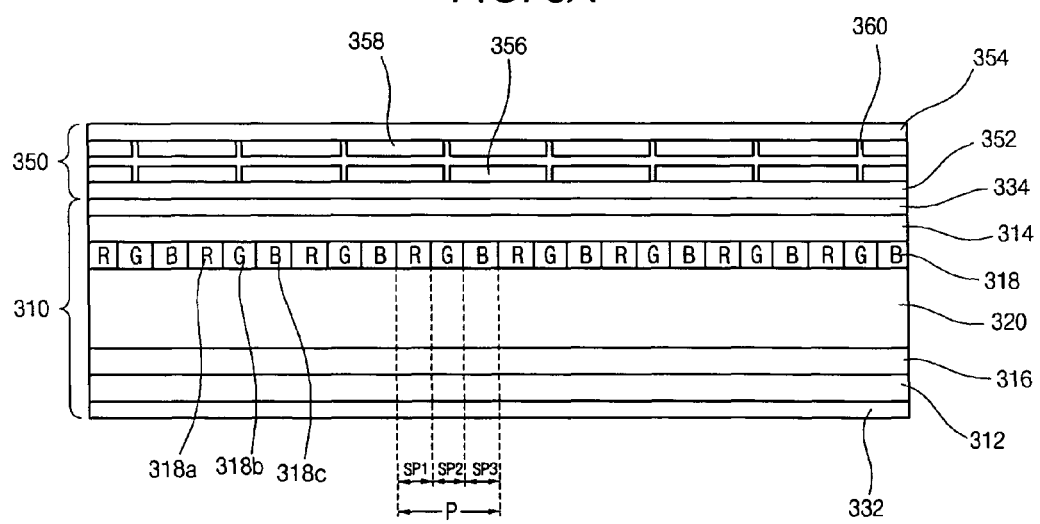
FIG. 3A is a cross-sectional view of a liquid crystal display device according to an exemplary embodiment of the present invention.
Figure 3B:
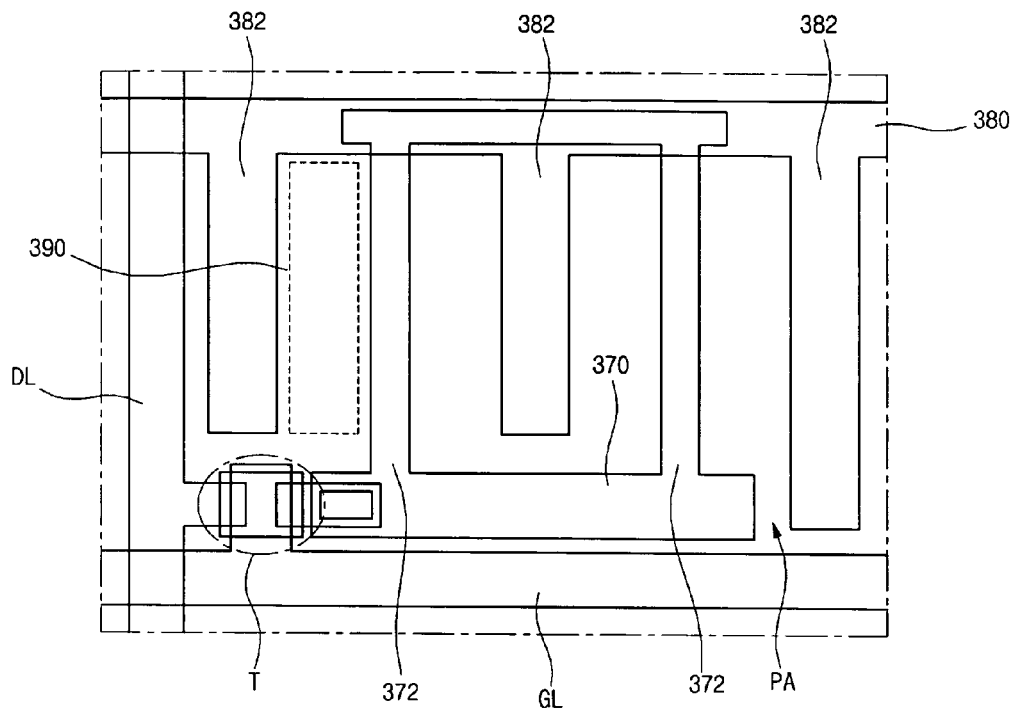
FIG. 3B is a plan view of an array portion of FIG. 3A.
Figure 3C:
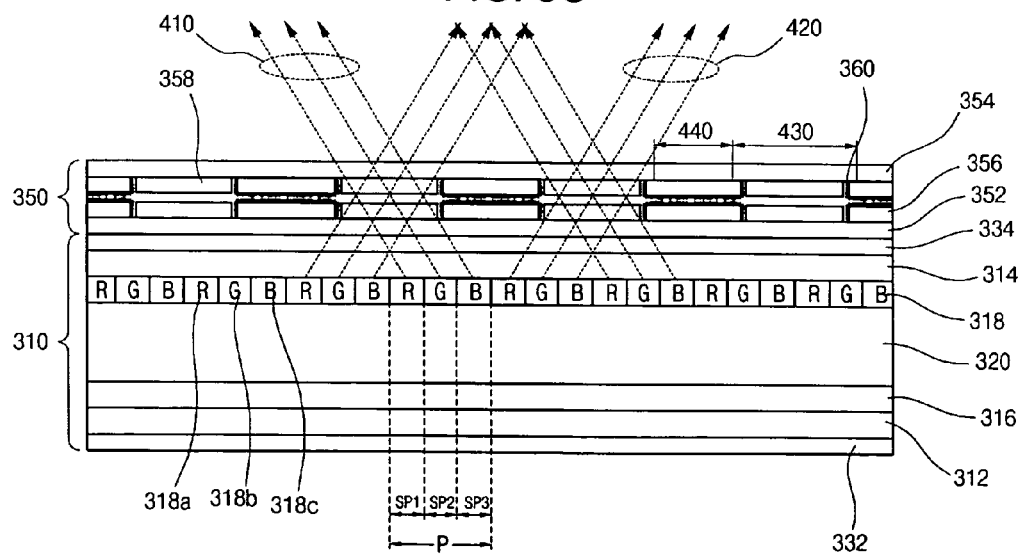
FIG. 3C is a cross-sectional view illustrating a method of displaying dual images in the liquid crystal display device of FIG. 3A.

FIG. 3A is a cross-sectional view of a liquid crystal display device according to an exemplary embodiment of the present invention, FIG. 3B is a plan view of an array portion of FIG. 3A, and FIG. 3C is a cross-sectional view illustrating a method of displaying dual images in the liquid crystal display device of FIG. 3A. As shown in FIGS. 3A to 3C, the liquid crystal display device includes a display cell 310 and a control cell 350. The display cell 310 displays one image or dual images, as users need, and the control cell 350 controls light path of the images emitted from the main cell 310.

The display cell 310 includes first and second substrates 312 and 314, and a layer of liquid crystal molecules 320 between the two substrates 312 and 314. The display cell 310 has a plurality of pixels P, and each pixel P has first, second and third sub-pixels SP1, SP2 and SP3. The first, second and third sub-pixels SP1, SP2 and SP3 may emit red (R), green (G) and blue (B) colors, respectively. The first and second substrates 312 and 314 are transparent.

An array portion 316 is disposed on an inner surface of the first substrate 312. In the array portion 316, a gate line GL and a data line DL are disposed on the first substrate 312 and cross each other to define a sub-pixel region PA. A common line 380 is spaced apart from the gate line GL. A thin film transistor T is disposed adjacent to a crossing of the gate and data lines GL and DL. In each sub-pixel region PA, a pixel electrode 372 and a common electrode 382 are alternately arranged. The pixel electrode 372 is connected to the thin film transistor T through a connection line 370. The common electrode 382 branches off from the common line 380. The pixel and common electrodes 372 and 382 induce an in-plane electric field, and a region 390 between the pixel and common electrodes 372 and 382 is an aperture region where the liquid crystal molecules in the layer of liquid crystal molecules 320 are driven by the in-plane electric field.

On an inner surface of the second substrate 314, a color filter layer is disposed. A color filter layer includes first, second and third color filters 318a, 318b and 318c in the corresponding sub-pixels SP1, SP2 and SP3. The first, second and third color filters 318a, 318b and 318c may be red (R), green (G) and blue (B) color filters, respectively. Although not shown in the drawings, a black matrix is disposed on the inner surface of the second substrate 314. The black matrix may correspond to the gate and data lines GL and DL and the thin film transistor T.

First and second polarizing films 332 and 334 are disposed on outer surfaces of the first and second substrates 312 and 314, respectively.

The display cell 310 driven in an IPS mode is explained in reference to FIGS. 3A to 3C. The display cell 310 may be driven in other modes, for example, an FFS mode or a VA mode. Although not shown in the FIGS. 3A to 3C, a backlight unit is disposed below the display cell 310 to supply light to the display cell 310. The control cell 350 is disposed on the display cell 310. The control cell 350 includes third and fourth substrates 352 and 354 and an electro-chromic material layer 360 between the two substrates 352 and 354. The third and fourth substrates 352 and 354 are transparent.

A plurality of first electrodes 356 are disposed on an inner surface of the third substrate 352 and spaced apart from one another. A plurality of second electrodes 358 are disposed on an inner surface of the fourth substrate 354 and spaced apart from one another. The first and second electrodes 356 and 358 directly face each other. The first and second electrodes 356 and 358 may be made of a transparent conductive material, such as indium-tin-oxide (ITO), indium-zinc-oxide (IZO) and indium-tin-zinc-oxide (ITZO). The first and second electrodes 356 and 358 may have various sizes.

The electro-chromic material has a reversible color change property in accordance with an applied voltage. In other words, the electro-chromic material has a reversible color change corresponding to an electric field. Color of the electro-chromic material is changed reversibly by an electrochemical oxidation-reduction reaction. The electro-chromic material is colorless (transparent) for one of an oxidation and a reduction and has a color for the other of an oxidation and a reduction. The electro-chromic material may include at least one of tungsten oxide ($WO_3$), molybdenum oxide ($MoO_3$), titanium oxide ($TiO_3$), vanadium oxide ($V_2O_5$), iridium oxide ($IrO2$), niobium oxide ($Nb_2O_5$) and nickel oxide (NiO).

Although not shown in FIGS. 3A to 3C, lines applying voltages to the first and second electrodes 356 and 358 are disposed on the inner surface of the third and fourth substrates 352 and 354, respectively. Some of the plurality of first electrodes 356 may have a voltage applied and some of the plurality of second electrodes 358 may have a voltage applied when displaying dual images. The liquid crystal display device can display a single image or dual images. Hereinafter, methods of displaying a single image and dual images with the liquid crystal display device are explained.

To display a single image in the liquid crystal display device, the display cell 310 makes a single image. To do this, the gate lines GL are sequentially applied with an ON gate signal, and the thin film transistors T connected to the gate line GL applied with the ON gate signal are turned on. When the thin film transistors T are turned on, data signals for making the single image are applied to the corresponding sub-pixels SP1, SP2 and SP3 through the corresponding data lines DL. Accordingly, the single image desired is made in the display cell 310.

The control cell 350 is entirely transparent when the single image is displayed in the liquid crystal display device, thereby allowing the single image to pass straight through. The electro-chromic material is colorless when the first and second electrodes 356 and 358 are not supplied with voltages and have color when the first and second electrodes 356 and 358 are supplied with voltages. All of the entire first and second electrodes 356 and 358 are not supplied with voltages, and thus the electro-chromic material layer 360 is transparent. Since the control cell 350 is transparent, light of the single image made in the display cell 310 passes straight through the control cell 350. Therefore, users can see the single image desired. In particular, when the display cell 310 has a wide viewing angle property, the liquid crystal display device also has a wide viewing angle property, and thus users can see the single image over a wide range of various directions.

To display dual images in the liquid crystal display device, the display cell 310 makes dual images, referring to FIG. 3C. To do this, the gate lines GL are sequentially applied with an ON gate signal, and the thin film transistors T connected to the gate line GL applied with the ON gate signal are turned on. When the thin film transistors T are turned on, data signals for making the dual images are applied to the corresponding sub-pixels SP1, SP2 and SP3 through the corresponding data lines DL. In more detail, the data signals are divided into first and second data signals. The first data signals are for making a first image of the dual images, and the second data signals are for making a second image of the dual images. If the first data signals are supplied to the sub-pixels SP1, SP2 and SP3 of odd pixels P, the second data signals are supplied to the sub-pixels SP1, SP2 and SP3 of even pixels P. In other words, the first data signals and the second data signals are alternately applied to the sub-pixels SP1, SP2 and SP3 by the pixel P. Accordingly, the dual images desired are simultaneously made in the display cell 310.

The control cell 350 is transparent and opaque alternately when the dual images are displayed in the liquid crystal display device, thereby guiding the dual images toward different directions desired. In other words, the control cell 350 has a transmissive region 430 and a blocking region 440 arranged alternately. The electro-chromic material is colorless when the first and second electrodes 356 and 358 are not supplied with voltages and has color when the first and second electrodes 356 and 358 are supplied with voltages. The first and second electrodes 356 and 358 of a number of M are not supplied with voltages to form the transmissive region 430, and the first and second electrodes 356 and 358 of a number of N are supplied with voltages to form the blocking region 440 (where m and n may be equal or different). Accordingly, the transmissive region 430 and the blocking region 440 are alternately formed in the control cell 350. The electro-chromatic material may be discolored on surfaces of the first and second electrodes 356 and 358 when voltages are applied. As shown in FIGS. 3A to 3C, the first and second electrodes 356 and 358 may have a size corresponding to the pixel P.

The arrangement of the alternated pixels P (or sub-pixels) for first and second images and the arrangement of the alternated transmissive and blocking regions 430 and 440 make light of the first image from the display cell 310 going toward a first direction 410 and not going toward a second direction 420, and makes light of the second image from the display cell 310 going toward the second direction 420 and not going toward the first direction 410. Accordingly, the first and second images are mainly displayed at the first and second directions, respectively, so that a main viewing angle of the first image is generally in the first direction 410 and a main viewing angle range of the second image is generally in the second direction 420. Therefore, users generally viewing in the first direction can see the first image, and users generally viewing in the second direction can see the second image.

The transmissive region 430 may be disposed such that the transmissive region 430 overlaps both the pixel P for the first image and the pixel P for the second image. Further, the blocking region 440 may be disposed such that the blocking region 440 overlaps both the pixel P for the first image and the pixel P for the second image. The alternating number of the pixels may correspond to the alternating number of the transmission and blocking regions 430 and 440.

FIGS. 4A to 4E are cross-sectional views of liquid crystal display devices according to another exemplary embodiment of the present invention. The liquid crystal display devices of FIGS. 4A to 4E are similar to the liquid crystal display device of FIGS. 3A to 3C, except for a structure of the control cell. Thus, explanations of parts similar to parts of FIGS. 3A to 3C are omitted for simplicity.

Figure 4A:
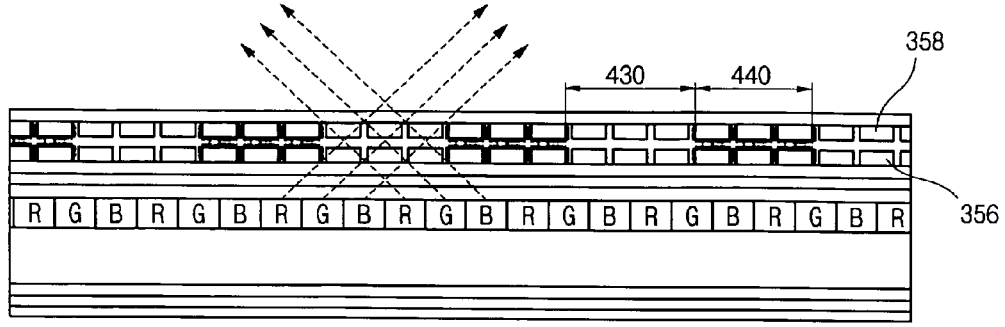

As shown in FIG. 4A, first and second electrodes 356 and 358 have a size corresponding to the sub-pixel, different from those of FIG. 3C. When dual images are displayed, three first and second electrodes 356 and 358 are not supplied with voltages to form a transmissive region 430, and next three first and second electrodes 356 and 358 are supplied with voltages to form a blocking region 440. A position relation between the transmissive and blocking regions 430 and 440 and the pixel is similar to a position relation of FIG. 3C, and thus, the viewing angles for the dual images are similar to the main viewing angle ranges of FIG. 3C.

Figure 4B:
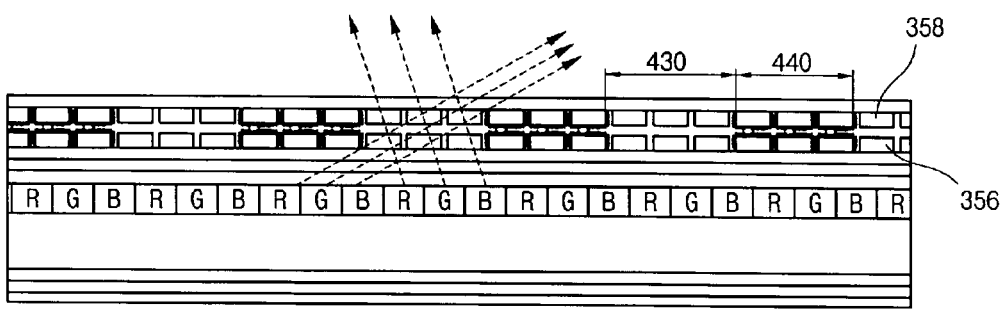

As shown in FIG. 4B, first and second electrodes 356 and 358 have a size corresponding to the sub-pixel, like those of FIG. 4A. When dual images are displayed, three first and second electrodes 356 and 358 are not applied with voltages to form a transmissive region 430, and next three first and second electrodes 356 and 358 are applied with voltages to form a blocking region 440. A position relation between the transmissive and blocking regions 430 and 440 and the pixel is different from a position relation of FIG. 4A, and thus, the main viewing angles for the dual images are different from the main viewing angles of FIG. 4A.

Figure 4C:
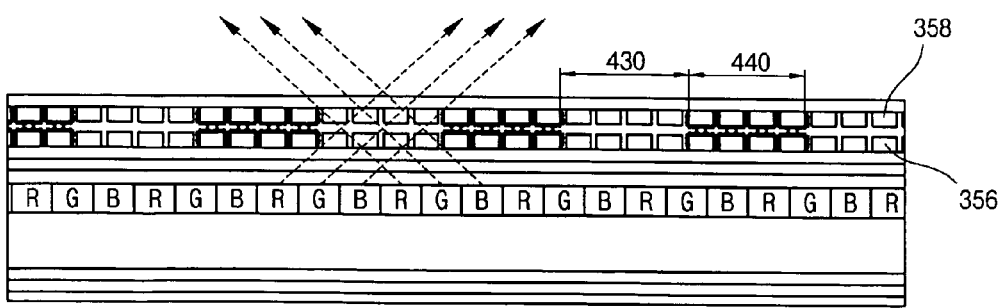

As shown in FIG. 4C, first and second electrodes 356 and 358 have a size less than the sub-pixel, different from those of FIGS. 4A and 4B. When dual images are displayed, four first and second electrodes 356 and 358 are not applied with voltages to form a transmissive region 430, and next four first and second electrodes 356 and 358 are applied with voltages to form a blocking region 440. A position relation between the transmissive and blocking regions 430 and 440 and the pixel is similar to a position relation of FIG. 4A, and thus, the main viewing angles for the dual images are similar to the main viewing angles of FIG. 4A.

Figure 4D:
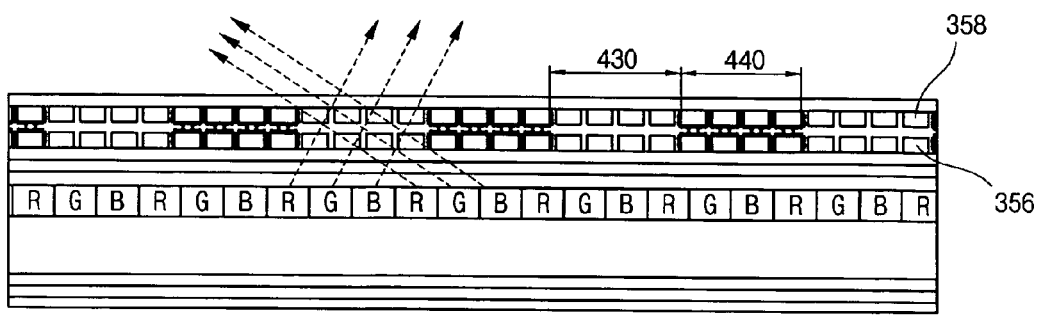

As shown in FIG. 4D, first and second electrodes 356 and 358 have a size less than the sub-pixel, like those of FIG. 4C. When dual images are displayed, four first and second electrodes 356 and 358 are not applied with voltages to form a transmissive region 430, and next four first and second electrodes 356 and 358 are applied with voltages to form a blocking region 440. A position relation between the transmissive and blocking regions 430 and 440 and the pixel is different from a position relation of FIG. 4C, and thus, the main viewing angles for the dual images are different from the main viewing angles of FIG. 4C.

Figure 4E:
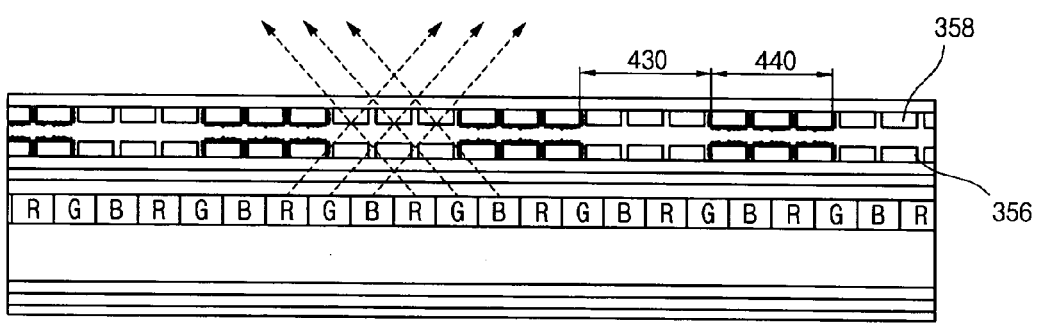

As shown in FIG. 4E, a control cell is similar to that of FIG. 4A, except for a cell gap. A position relation between the transmissive and blocking regions 430 and 440 and the pixel is similar to a position relation of FIG. 4A, and the cell gap i.e., a distance between the first and second electrodes 356 and 358 is more than that of FIG. 4A. Therefore, the main viewing angles for the dual images are different from the main viewing angles of FIG. 4A. As explained above, the main viewing angles for the dual images can be adjusted as the positions of the transmissive and blocking regions and the cell gap are adjusted.

Figure 5:
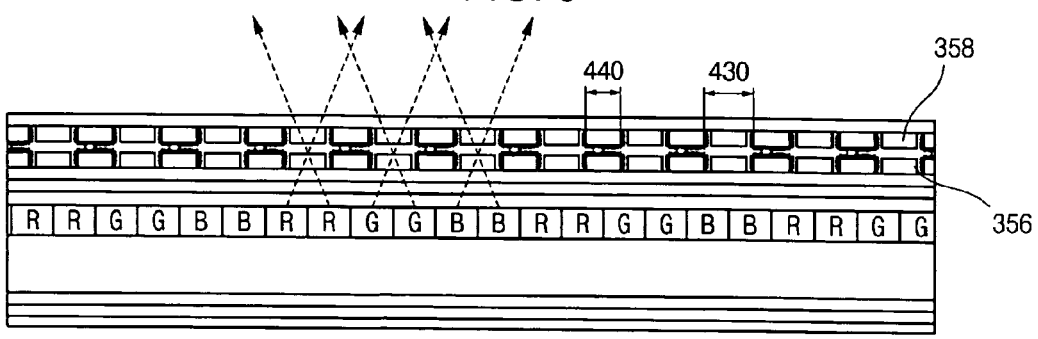

FIG. 5 is a cross-sectional view of a liquid crystal display device according to another exemplary embodiment of the present invention. The liquid crystal display device of FIG. 5 is similar to the liquid crystal display devices of FIGS. 3A to 4E, except for arrangement of the sub-color filters. Thus, explanations of parts similar to parts of FIGS. 3A to 4E are omitted for simplicity.

As shown in FIG. 5, arrangement of color filters is different from arrangement of color filters of FIGS. 3A to 4E. As shown in FIGS. 3A to 4E, when dual images are displayed, since color filters are arranged such that one pixel makes a first image and adjacent pixel makes a second image, the color filters having the same color are spaced apart by three sub-pixels. FIGS. 3A to 4E show a structure that a pixel for the first image and a pixel for the second image are adjoined and alternately arranged. In FIG. 5, two color filters having the same color are adjoined. One of the adjacent two color filters of the same color is for a first image, and the other of the adjacent two color filters of the same color is for a second image.

The arrangement of the alternated sub-pixels for first and second images and the arrangement of the alternated transmissive and blocking regions make light of the first image from the display cell 310 going toward a first direction 410 and not going toward a second direction 420, and makes light of the second image from the display cell 310 going toward the second direction 420 and not going toward the first direction 410. Accordingly, the first and second images are mainly displayed at the first and second directions, respectively, so that a main viewing angle of the first image is the first direction 410 and a main angle of the second image is the second direction 420. Therefore, users in the first direction can see the first image, and users in the second direction can see the second image. The alternating number of the sub-pixels may correspond to the alternating number of the transmission and blocking regions 430 and 440. The transmissive region 430 may be disposed such that the transmissive region 430 overlaps the adjacent two same color filters for the first and second images, and the blocking region 440 may be also disposed such that the blocking region 440 overlaps the adjacent two different color filters for the first and second images.

FIG. 6 is a cross-sectional view of a liquid crystal display device according to another exemplary embodiment of the present invention. The liquid crystal display device of FIG. 6 is similar to the liquid crystal display device of FIGS. 3A to 3C, except for a structure of the control cell. Thus, explanations of parts similar to parts of FIG. 3A to 3C are omitted for simplicity. As shown in FIG. 6, first and second electrodes 556 and 558 are formed only in a blocking region 540 and not in a transmissive region 530. Accordingly, when dual images are displayed, the transmissive region 530 and the blocking region 540 are fixed, and thus main viewing angles for each of the dual images are also fixed.

FIG. 7 is a cross-sectional view of a liquid crystal display device according to another exemplary embodiment of the present invention. The liquid crystal display device of FIG. 7 is similar to the liquid crystal display device of FIG. 5, except for a structure of the control cell. Thus, explanations of parts similar to parts of FIG. 5 are omitted for simplicity. As shown in FIG. 7, first and second electrodes 556 and 558 are formed only in a blocking region 540 and not in a transmissive region 530. Accordingly, when dual images are displayed, the transmissive region 530 and the blocking region 540 are fixed, and thus main viewing angles for each of the dual images are also fixed.

As explained in the above exemplary embodiments, the display cell makes a single image or dual images, and the control cell selectively adjusts light path depending on the number of images made by the display cell. Therefore, not only the single image but also the dual images having the different main viewing angles can be displayed effectively. The main viewing angles can be adjusted as positions of the transmissive and blocking regions and the cell gap are adjusted.

In the above exemplary embodiments, a liquid crystal cell is mainly explained as the display cell. However, other type cells can be used as the display cell, such as a plasma display panel and an organic electroluminescent display, as long as the cells of these displays can make a single image and dual images like the above-described liquid crystal cell. An electro-chromatic cell is mainly explained as the control cell. However, other types of light guide cells can be used as the control cell if those cells can adjust a light path like the electro-chromatic cell. In the above exemplary embodiments, the display of the dual images is mainly explained. However, display of more than dual images can be achieved by adjusting the arrangement of the pixels (or sub-pixels) and the transmissive and blocking regions.

It will be apparent to those skilled in the art that various modifications and variations can be made in the method of fabricating the display device and the method of fabricating the display device the present invention without departing from the spirit or scope of the invention. Thus, it is intended that the present invention cover the modifications and variations of this invention provided they come within the scope of the appended claims and their equivalents.

What is claimed is:

1. A display device, comprising:
    a display cell having a plurality of sub-pixels to make a single image or dual images, the plurality of sub-pixels including a first group for displaying a first image of the dual images and a second group for displaying a second image of the dual images; and
    a control cell for passing through the single image, and guiding the first image toward a first direction and the second image toward a second direction different from the first direction,
    wherein the control cell includes a plurality of first electrodes spaced apart from each other and a plurality of second electrodes spaced apart from each other, wherein the plurality of first electrodes face the plurality of second electrodes,
    wherein the control cell includes first and second regions alternately arranged, the first and second regions are transparent for the single image, and the first and second regions are alternatingly transparent and opaque, respectively, for displaying the dual images,
    wherein a width of the first region is determined according to a first number of the plurality of first and second electrodes that a voltage is not applied and a width of the second region is determined according to a second number of the plurality of first and second electrodes that the voltage is applied,
    wherein the first and second directions are controlled by the widths of the first and second regions,
    wherein the plurality of sub-pixels include first and second alternately arranged sub-pixels, and the first and second sub-pixels make the first and second images, respectively,
    wherein each of the first and second sub-pixels has first, second and third colors such that the first sub-pixel of the first color, the second sub-pixel of the first color, the first sub-pixel of the second color, the second sub-pixel of the second color, the first sub-pixel of the third color and the second sub-pixel of the third color are sequentially arranged,
    wherein the first and second sub-pixels having the same color adjoin each other, and
    wherein the first region overlaps the two adjacent first and second sub-pixels having the same color and the second region overlaps the two adjacent first and second sub-pixels having the different color.

2. The device according to claim 1, wherein the control cell includes first and second regions alternately arranged, and the first and second regions are transparent for the single image, and the first and second regions are alternatingly transparent and opaque, respectively, for displaying the dual images.

3. The device according to claim 2, wherein the control cell includes an electro-chromatic cell having first and second substrates, an electro-chromatic material between the first and second substrates, a plurality of first electrodes on an inner surface of the first substrate, and a plurality of second electrodes on an inner surface of the second substrate, wherein the first and second electrodes correspond to each other.

4. The device according to claim 3, wherein the plurality of first electrodes and the plurality of second electrodes are arranged both in the first and second regions.

5. The device according to claim 3, wherein the plurality of first electrodes and the plurality of second electrodes are arranged in the second region.

6. The device according to claim 3, wherein the electro-chromatic material includes at least one of tungsten oxide ($WO_3$), molybdenum oxide ($MoO_3$), titanium oxide ($TiO_3$), vanadium oxide ($V_2O_5$), iridium oxide ($IrO_2$), niobium oxide ($Nb_2O_5$) and nickel oxide (NiO).

7. The device according to claim 1, wherein the display cell includes a liquid crystal cell.

8. The device according to claim 7, wherein the liquid crystal cell includes an IPS mode cell, an FFS mode cell and a VA mode cell.

9. A method of driving a display device, comprising:
    making a single image or dual images in a display cell having a plurality of sub-pixels, the plurality of sub-pixels including a first group for displaying a first image of the dual images and a second group for displaying a second image of the dual images;
    passing the single image through a control cell to display the single image, and guiding the first image toward a first direction and the second image toward a second direction different from the first direction through the control cell to display the dual images; and
    applying first and second data signals to first and second sub-pixels alternately arranged of the plurality of sub-pixels, respectively, to make the dual images, the first and second data signals being for the first and second images, respectively,
    wherein the control cell includes a plurality of first electrodes spaced apart from each other and a plurality of second electrodes spaced apart from each other,
    wherein the plurality of first electrodes face the plurality of second electrodes,
    wherein the control cell includes first and second regions alternately arranged, the first and second regions are transparent for the single image, and the first and second regions are alternatingly transparent and opaque, respectively, for displaying the dual images,
    wherein a width of the first region is determined according to a first number of the plurality of first and second electrodes that a voltage is not applied and a width of the second region is determined according to a second number of the plurality of first and second electrodes that the voltage is applied,
    wherein the first and second directions are controlled by the widths of the first and second regions,
    wherein the first and second sub-pixels make the first and second images, respectively,
    wherein each of the first and second sub-pixels has first, second and third colors such that the first sub-pixel of the first color, the second sub-pixel of the first color, the first sub-pixel of the second color, the second sub-pixel of the second color, the first sub-pixel of the third color and the second sub-pixel of the third color are sequentially arranged,
    wherein the first and second sub-pixels having the same color adjoin each other,
    wherein the first region overlaps the two adjacent first and second sub-pixels having the same color and the second region overlaps the two adjacent first and second sub-pixels having the different color.

10. The method according to claim 9, wherein the control cell includes first and second regions alternately arranged, and the first and second regions are transparent for the single image and the first and second regions are alternatingly transparent and opaque, respectively, for the dual images.

11. The method according to claim 10, wherein the control cell includes an electro-chromatic cell having first and second substrates, an electro-chromatic material between the first and second substrates, a plurality of first electrodes on an inner surface of the first substrate, and a plurality of second electrodes on an inner surface of the second substrate, and the first and second electrodes correspond to each other.

12. The method according to claim 11, wherein the plurality of first electrodes and the plurality of second electrodes are arranged both in the first and second regions.

13. The method according to claim 12, wherein the plurality of first and second electrodes in the second region are applied with voltages to make the electro-chromatic material in the second region opaque when displaying the dual images.

14. The method according to claim 11, wherein the plurality of first electrodes and the plurality of second electrodes are arranged in the second region.

15. The method according to claim 14, wherein the plurality of first and second electrodes are supplied with voltages to make the electro-chromatic material in the second region opaque when displaying the dual images.

16. The method according to claim 11, wherein the electro-chromatic material includes at least one of tungsten oxide ($WO_3$), molybdenum oxide ($MoO_3$), titanium oxide ($TiO_3$), vanadium oxide ($V_2O_5$), iridium oxide ($IrO_2$), niobium oxide ($Nb_2O_5$) and nickel oxide (NiO).

17. The method according to claim 9, wherein the display cell includes a liquid crystal cell.

18. The method according to claim 17, wherein the liquid crystal cell includes an IPS mode cell, an FFS mode cell and a VA mode cell.

19. A method of driving a display device, comprising:
making a single image or dual images in a display cell having a plurality of sub-pixels, the plurality of sub-pixels including a first group for displaying a first image of the dual images and a second group for displaying a second image of the dual images;
making a control cell entirely transparent for the single image to pass through when displaying the single image, alternatingly transparent and opaque to pass the first and second images toward first and second directions, respectively, and blocking the first and second images toward the second and first directions, respectively, when displaying the dual images; and
applying first and second data signals to first and second sub-pixels alternately arranged of the plurality of sub-pixels, respectively, to make the dual images, the first and second data signals being for the first and second images, respectively,
wherein the control cell includes a plurality of first electrodes spaced apart from each other and a plurality of second electrodes spaced apart from each other,
wherein the plurality of first electrodes face the plurality of second electrodes,
wherein the control cell includes first and second regions alternately arranged, the first and second regions are transparent for the single image, and the first and second regions are alternatingly transparent and opaque, respectively, for displaying the dual images,
wherein a width of the first region is determined according to a first number of the plurality of first and second electrodes that a voltage is not applied and a width of the second region is determined according to a second number of the plurality of first and second electrodes that the voltage is applied,
wherein the first and second directions are controlled by the widths of the first and second regions,
wherein the first and second sub-pixels make the first and second images, respectively,
wherein each of the first and second sub-pixels has first, second and third colors such that the first sub-pixel of the first color, the second sub-pixel of the first color, the first sub-pixel of the second color, the second sub-pixel of the second color, the first sub-pixel of the third color and the second sub-pixel of the third color are sequentially arranged,
wherein the first and second sub-pixels having the same color adjoin each other,
wherein the first region overlaps the two adjacent first and second sub-pixels having the same color and the second region overlaps the two adjacent first and second sub-pixels having the different color.

20. The method according to claim 19, further comprising alternately applying voltages to a electro-chromatic material of the control cell to make portions of the control cell transparent and opaque alternately.

* * * * *